US008396975B2

(12) United States Patent
Tsunogai

(10) Patent No.: US 8,396,975 B2
(45) Date of Patent: Mar. 12, 2013

(54) MANAGING REQUESTS FOR CONNECTION TO A SERVER

(75) Inventor: Katsuya Tsunogai, Setagaya-ku (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/434,974

(22) Filed: Mar. 30, 2012

(65) Prior Publication Data

US 2012/0191867 A1 Jul. 26, 2012

Related U.S. Application Data

(62) Division of application No. 10/053,791, filed on Jan. 22, 2002, now Pat. No. 8,224,963.

(30) Foreign Application Priority Data

Jan. 25, 2001 (JP) .................................. 2001-017625

(51) Int. Cl.
 *G06F 15/16* (2006.01)
(52) U.S. Cl. ........ 709/228; 709/225; 709/227; 709/229; 709/232; 709/249
(58) Field of Classification Search .................. 709/205, 709/207, 217, 228, 239
See application file for complete search history.

(56) References Cited

U.S. PATENT DOCUMENTS

| | | | |
|---|---|---|---|
| 5,220,674 A | 6/1993 | Morgan et al. | |
| 5,675,638 A | 10/1997 | Ogasawara et al. | |
| 5,761,507 A | 6/1998 | Govett | |
| 5,867,652 A | 2/1999 | Hurvig | |
| 5,941,948 A | 8/1999 | Chang et al. | |
| 6,070,184 A | 5/2000 | Blount et al. | |
| 6,128,644 A | 10/2000 | Nozaki | |
| 6,288,790 B1 | 9/2001 | Yellepeddy et al. | |
| 6,473,407 B1 | 10/2002 | Ditmer et al. | |
| 6,625,118 B1 | 9/2003 | Hadi Salim et al. | |
| 6,654,830 B1 | 11/2003 | Taylor et al. | |
| 6,742,016 B1 * | 5/2004 | Bhoj et al. | 709/207 |
| 6,754,693 B1 * | 6/2004 | Roberts et al. | 709/205 |
| 6,799,276 B1 | 9/2004 | Belissent | |
| 2005/0149760 A1 | 7/2005 | Alam et al. | |

FOREIGN PATENT DOCUMENTS

| | | |
|---|---|---|
| JP | 64-021558 | 1/1989 |
| JP | 07-302242 | 11/1995 |
| JP | 10-136336 | 5/1998 |
| JP | 2000-020423 | 1/2000 |

(Continued)

OTHER PUBLICATIONS

ALAM, Office Action Communication for U.S. Appl. No. 10/053,791 dated Jan. 3, 2006, 10 pages.

(Continued)

*Primary Examiner* — Yves Dalencourt
(74) *Attorney, Agent, or Firm* — Hoffman Warnick LLC

(57) ABSTRACT

A connection accepting system, an accepting server, and a connection-acceptance managing method, for reducing the processing load of a server and allowing connection to the server in the order of arrival of connection requests. An accepting server accepts a connection request to an application server made from a client terminal through a network. The accepting server issues a reference number to the client terminal at the time of receiving a first connection request, and manages a connection priority for connection to the application server, based on the reference number. The accepting server transmits a program for automatically executing a connection request again after a predetermined time period, at the time of issuing the reference number to the client terminal.

15 Claims, 12 Drawing Sheets

FOREIGN PATENT DOCUMENTS

| | | |
|---|---|---|
| JP | 2000-311134 | 11/2000 |
| JP | 2002-189650 | 7/2002 |

OTHER PUBLICATIONS

ALAM, Office Action Communication for U.S. Appl. No. 10/053,791 dated Jul. 18, 2006, 8 pages.

ALAM, Office Action Communication for U.S. Appl. No. 10/053,791 dated Dec. 29, 2006, 10 pages.

ALAM, Office Action Communication for U.S. Appl. No. 10/053,791 dated Jul. 2, 2007, 11 pages.

ALAM, Office Action Communication for U.S. Appl. No. 10/053,791 dated Dec. 12, 2007, 11 pages.

ALAM, Examiner's Answer for U.S. Appl. No. 10/053,791 dated May 1, 2008, 13 pages.

Dalencourt, Office Action Communication for U.S. Appl. No. 10/053,791 dated May 25, 2011, 15 pages.

Dalencourt, Office Action Communication for U.S. Appl. No. 10/053,791 dated Oct. 24, 2011, 16 pages.

Dalencourt, Notice of Allowance and Fee(s) Due for U.S. Appl. No. 10/053,791 dated Mar. 7, 2012, 5 pages.

\* cited by examiner

FIG. 4

```
<HTML>
<HEAD>
<TITLE>Max user reached</TITLE>
<META http-equiv="Pragma" content="no-cache">
</HEAD>
<SCRIPT LANGUAGE = JAVASCRIPT>
function requestConnect 0 {                      (B)
  u = "/servlet/ConnectServlet?cmd=connect"
  location replace(u)
}
function cancelRequest 0 {                       (D)
  u = "/servlet/ConnectServlet?cmd=cancel"
  location replace(u)
}
</SCRIPT>                                                    (A)
<BODY bgcolor="#ccccff" onload=setTimeout('requestConnect 0', $Interval)>
<CENTER>
<H1>
<TABLE>
<TR><TD><H3>
Being crowded now.
<BR><BR>
</TD></TR>
<TR><TD><H4>
You can log in in the order of "$Order" of "$QueueSize" people. <BR>
</TD></TR>
<TR><TD><H4>
Your reference number is "$DTX_Ticket" <BR>
</TD></TR>
<BR>
</H2></TABLE>
</H1>                                                        (C)
<FORM>
<INPUT type="button" name="button1" value="Cancel" onClick=cancelRequest 0>
</FORM>
</CENTER>
</BODY>
</HTML>
```

FIG. 12

Status Information

| | | |
|---|---|---|
| Acquired Right of Connection { | Reference number #1 | With a right of connection |
| | ⋮ | With a right of connection |
| | ⋮ | ⋮ |
| | ⋮ | ⋮ |
| | ⋮ | With a right of connection |
| | Reference number #(n-1) | With a right of connection |
| Connection Queue B { | Reference number #n | Without a right of connection |
| | ⋮ | Without a right of connection |
| | ⋮ | ⋮ |
| | ⋮ | ⋮ |
| | ⋮ | Without a right of connection |
| | Reference number #m | Without a right of connection |

D

MANAGING REQUESTS FOR CONNECTION TO A SERVER

CROSS REFERENCE TO RELATED APPLICATIONS

This patent application is a divisional of U.S. patent application Ser. No. 10/053,791 filed Jan. 22, 2002, which issued as U.S. Pat. No. 8,224,963 on Jul. 17, 2012, and which claims priority to Japanese Patent Application No. 2001-017625, filed Jan. 25, 2001, both of which are incorporated by reference.

BACKGROUND OF THE INVENTION

The present invention relates to a client/server and in particular a system and method for connecting clients to a heavily loaded server according to connection priority.

It is common knowledge that networks, such as the Internet, local area networks (LAN), and so forth have recently spread. In such networks, a server often executes various processes requested by client terminals through the network.

The allowable throughput of such a server has a limit, depending on the throughput of a CPU, the data transfer capacity at the input-output interface, the data transfer capacity between the database for storing various data and the server, the number of concurrent threads, the capacity of cache memory used in the processing of each thread, and so forth.

When a large number of requests are made in parallel from a plurality of client terminals through a network, the capacity of the server may be exceeded. As a result, it becomes difficult for the server to respond in a timely way, and in some cases the server will not be able to process requests from client terminals normally.

For this reason, the server limits the number of client terminals that can be connected. When the connection requests from client terminals reach the limit, the server refuses to connect with any additional client terminals. Thus, the server ensures a certain level of throughput for executing processes requested by client terminals that have already been connected with the server, by refusing connection requests greater than the limit.

However, when the number of client terminals that can be connected is limited at the side of the server as described above, a user wishing to access the server may repeat a request for connection until a connection is established. For this reason, the server may receive far more connection requests than the number of client terminals actually requesting a connection. Furthermore, even when the server refuses a connection request, its processing load increases, as the refusal process is performed by use of a thread. Consequently, the server's responsiveness to connected clients may be reduced significantly by an avalanche of connection requests.

In addition, connections may be granted out of order, as connections are granted at random rather than according to waiting time.

SUMMARY OF THE INVENTION

The present invention addresses the problems mentioned above. Accordingly, an object of the present invention is to provide a connection accepting system, an accepting server, and a connection-acceptance managing method, which are capable of reducing the processing load of the server and granting connections in the order of arrival of initial requests for connection.

To attain the aforementioned object of the present invention, a server in a connection accepting system of the present invention sets a connection priority for a client terminal and transmits data concerning the connection priority to the client terminal, at the time of receiving a first connection request from the client terminal. Then, the server allows connection of the client terminal according to its connection priority at the time of receiving a second connection request from the client terminal after the first connection request. The client terminal displays connection priority information, based on the connection priority data transmitted from the server. In this manner, the server accepts a connection request from the client terminal with the highest connection priority.

The server may set the connection priority only in the case where a connection cannot be allowed at the time of receiving a first connection request from the client terminal. In the case where a connection can be allowed, the server can allow connection without setting any connection priority. In addition, at the time the first connection request is received from the client terminal, the connection priority can be set without condition regardless of whether or not a connection can be allowed. Based on this, connections can be managed.

The second connection request may be any request made after the first connection request. For example, if the connection request first made by the client terminal is assumed to be a first connection request, the third connection request and the requests thereafter, as well as the second connection request, can be thought of as the second connection request. Therefore, in the case where a connection request from the client terminal is refused when a connection cannot be established, a connection request made when a connection is allowed is considered to be the second connection request.

The connection priority that is set by the server may be indicated by a reference number, or a character or figure string or other symbols representing connection priority.

In addition, a connection request that is made to a server by the client terminal may be a connection request to that server. In the case where the connection accepting system of the present invention is further equipped with a second server for executing a process according to a request from the client terminal, the connection request may be a connection request to the second server. In this case, if the connection-management means of the first server allows connection of the client terminal, the client terminal is connected with the second server.

The accepting server of the present invention may be a server comprising: connection-order set means which, at the time of receiving a first connection request from the client terminals, sets the connection priority of the client terminal; and connection management means for allowing connection of the client terminals according to highest connection priority, at the time of receiving a second connection request from the client terminals after the first connection request.

The accepting server or other servers of the present invention may be further equipped with connection-number monitor means for monitoring a number of connectable client terminals. In this case, connection can be allowed to the client terminal with the highest connection priority, after acceptance of connection of a new client terminal has become possible, that is, when there is a vacancy in the first or second server.

The accepting server of the present invention can also transmit a program which automatically reruns or executes a connection request again, when refusing a connection request transmitted from the client terminal. Furthermore, when the accepting server of the present invention receives a connection request executed again based on the program by the client terminal, the accepting server may allow connection of the client terminal, based on the connection priority of the client terminal. The aforementioned program can contain both data of the time interval, for causing the client terminal to execute a connection request again, and data for specifying a target connection server, that is, an accepting server.

In addition, the time interval for causing the client terminals to again execute a connection request can be set to a plurality of stages, based on the connection priorities of the client terminals, by an accepting server. For instance, the time interval for performing a connection request by the client terminal having a lower connection priority can be made longer than the time interval for a client terminal having a higher connection priority. Therefore, the number of connection requests can be suppressed as a whole. The time interval can be set to any number of stages.

In another accepting server of the present invention, the number of connectable client terminals is detected. The connection of the client terminal that made a connection request is allowed when the number of connectable client terminals is a reference value or greater. The connection of the client terminal is refused when the number of connectable client terminals is less than the reference value. Then, the connection priority of the client terminal is set when connection of the client terminal is refused. When the number of connectable client terminals is increased to more than the reference value, the right of connection is granted to the client terminal whose connection priority is highest. Next, the connection of the client terminal granted a right of connection is allowed when a connection request from the client terminal is received.

In the accepting server of the present invention, the connection queue data holding means generates a connection queue, based on the connection priority, and holds data of the connection queue.

Also, the connection-right data holding means holds data for identifying the client terminal granted a right of connection. The connection queue data holding means and the connection-right data holding means may be provided so that they are separated from each other. However, the connection queue data holding means and the connection-right data holding means may be provided in the same matrix, by providing an index or status information which discriminates between the client terminals in the connection queue and the client terminals granted a right of connection.

The connection allowance means of the present invention may make reference to the data held in the connection-right data holding means if it receives a connection request from the client terminal, and may allow connection of the client terminal if it is confirmed that a right of connection has been granted to the client terminal.

Note that information on the connection priority of the client terminal may be contained in "Cookie" data that is transmitted from the accepting server to the client terminal. With use of the "Cookie" data, the information on the connection priority is held even when the browser window of the client terminal is closed. In addition, connection priority may also be contained in data other than the "Cookie" data.

The present invention includes a connection-acceptance managing method comprising the steps of: receiving a request for connection to a server from an external client terminal; deciding, in response to the connection request, whether or not a connection to the server is allowed; setting a connection priority for the client terminal when the connection is refused; granting a right of connection to the client terminal which has the highest connection priority, each time a connection to the server becomes possible; and confirming whether or not a right of connection has been granted to the client terminal, when a connection request is made by the client terminal for which the connection priority has been set, and allowing a connection of the client terminal to the server when a right of connection has been granted.

The present invention also includes a computer program that is executed by a computer which accepts requests of connection from client terminals, and a storage medium in which the computer program is stored so that the program is readable by the computer.

The program may further include a process of transmitting both data concerning the connection priority set for a client terminal, and a program for causing the client terminal to automatically execute a connection request again, after a predetermined time period, to the client terminal.

Furthermore, the present invention includes a computer program which causes a computer to execute a process of transmitting a connection request execution program, for automatically executing a connection request again, to the client terminal when a connection request from the client terminal is refused. The present invention also includes a storage medium in which the computer program is stored so that the program is readable by the computer.

These and other aspects, advantages and salient features of the invention will become apparent from the following detailed description, which, when taken in conjunction with the annexed drawings, where like parts are designated by like reference characters throughout the drawings, disclose embodiments of the invention.

BRIEF DESCRIPTION OF THE DRAWINGS

FIG. 4 is a diagram showing an example of data that is transmitted to the client terminal, the data including a program for automatically transmitting the connection request again to the server after a predetermined time period.

FIG. 12 is a diagram showing the case where a connection queue, and client terminals granted rights of connection, are arranged in the same matrix and discriminated with status information.

DETAILED DESCRIPTION OF THE INVENTION

The present invention will be described in detail with reference to a preferred embodiment shown in the accompanying drawings.

Figure 1:
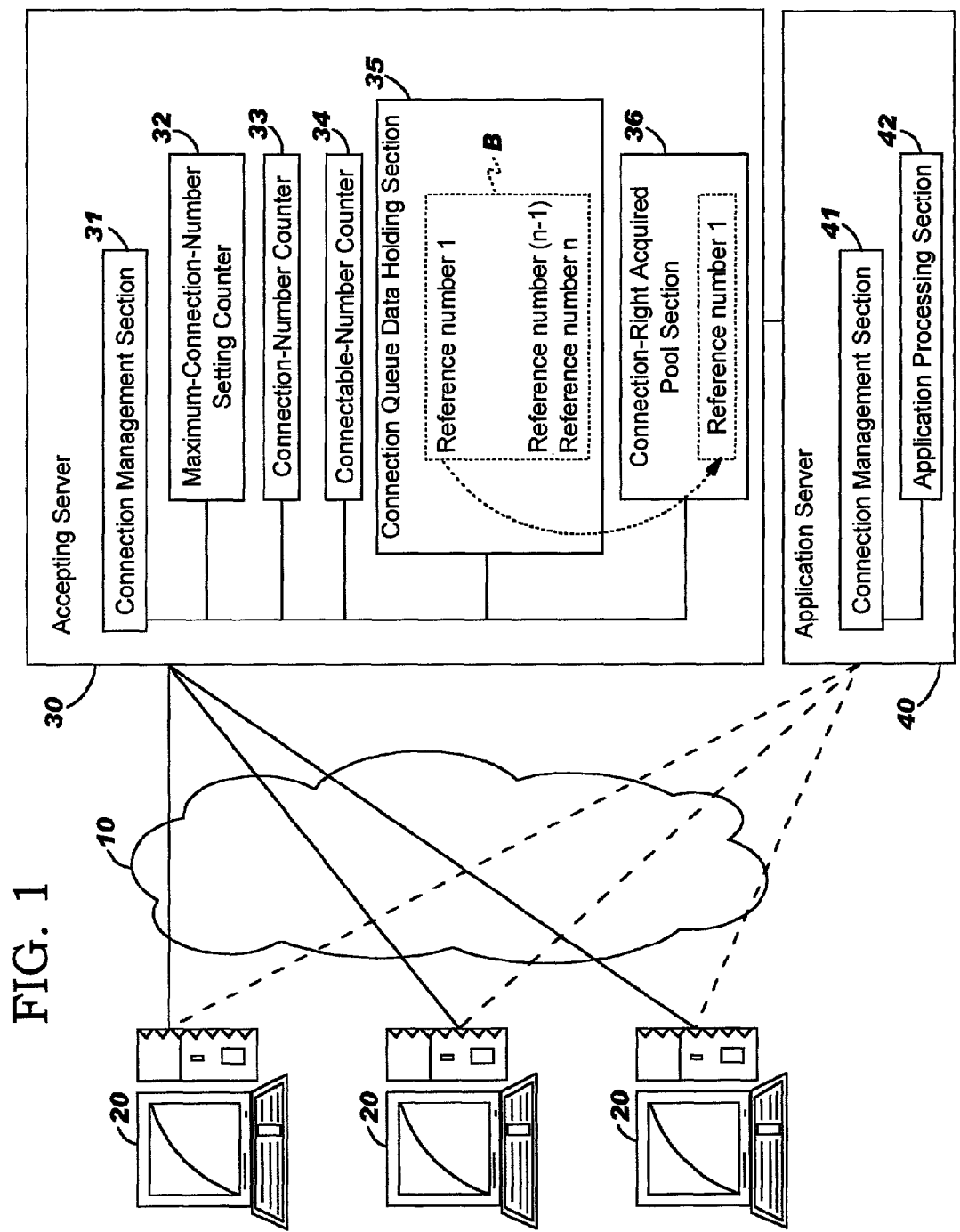
FIG. 1 is a block diagram showing a construction of a connection accepting system in a preferred embodiment of the present invention.
Figure 2:
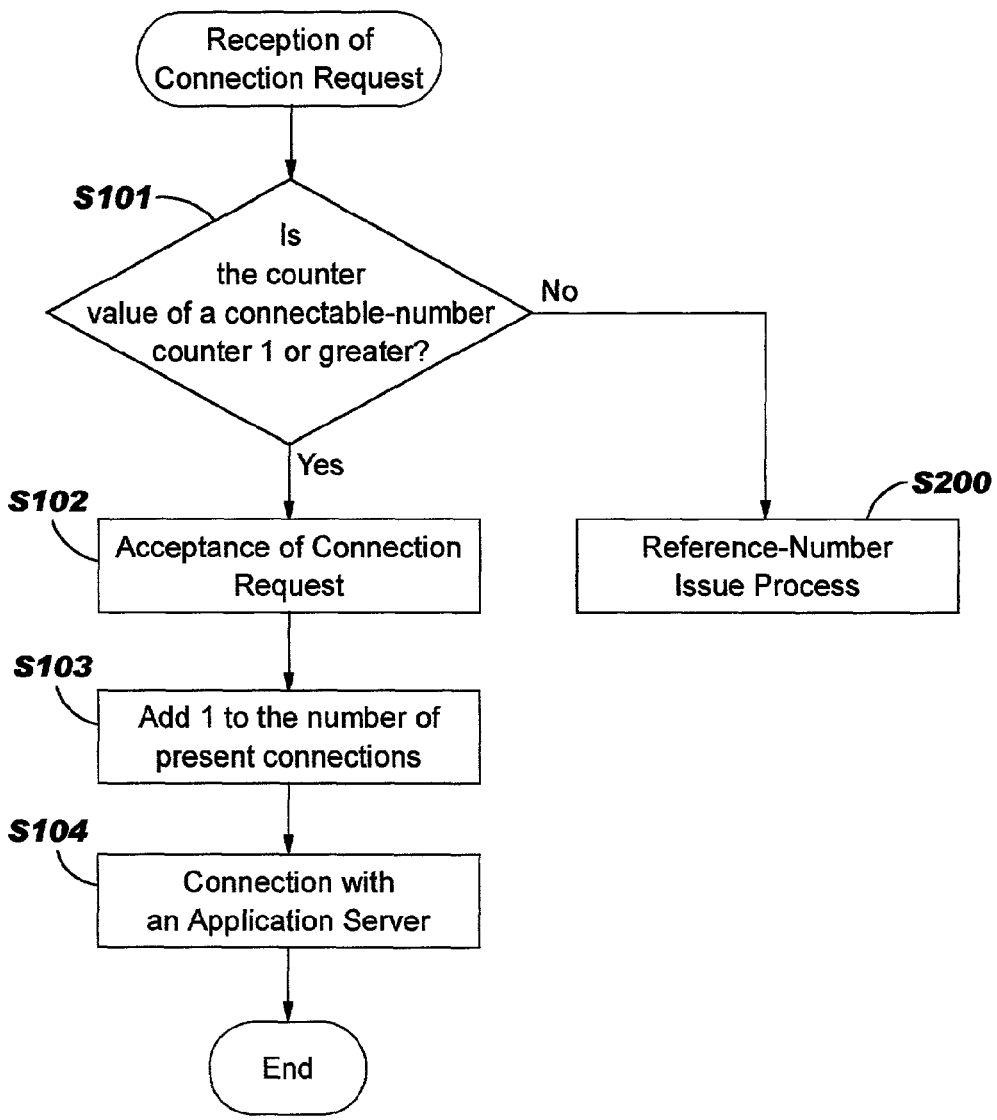
FIG. 2 is a diagram showing a flow for a process of deciding whether a connection is established or not, when a connection request is received.

FIG. 1 is a diagram for explaining the construction of a connection accepting system in the preferred embodiment of the present invention. In the figure, reference numeral 10 denotes a network such as the Internet, a local area network, and so forth, reference numeral 20 denotes a plurality of client terminals that users use, and reference numeral 30 denotes an accepting server (server) that accepts connection requests from the plurality of client terminals 20. Also, reference numeral 40 denotes an application server (another server) that executes a predetermined process in response to a request from the client terminal 20 where acceptance of the connection request has been completed in the accepting server 30.

Each client terminal 20 may include a personal computer (PC). The client terminal 20 has the function (or means) of receiving data transmitted from the accepting server 30 or application server 40, the function (or means) of executing a connection to the accepting server 30 or application server 40, and the browser function of displaying data transmitted from the accepting server 30 or application server 40.

The accepting server 30 is equipped with a connection management section 31 for executing a process of managing a connection in response to a connection request from the client terminal 20; a maximum-connection-number setting counter 32 to which the maximum number of connections that can be connected simultaneously to the application server 40 is set; a connection-number counter 33 for indicating the number of client terminals 20 being connected to the application server 40, and a connectable-number counter (connection-number monitoring means or connectable-number detection means) 34 for indicating the number of client terminals 20 that can be connected to the applications server 40. In this arrangement, there is a relationship of "value in connectable-number counter 34"="value in maximum-connection-number setting counter 32"–"value in connection-number counter 33"–"number of client terminals 20 whose reference number is present in connection-right acquired pool section 36 (to be described later)".

The connection management section 31 functions as connection management means and judgment means, and manages whether or not a connection is allowed in response to a connection request from the client terminal 20, based on a counter value in the connectable-number counter 34. The connection management section 31 allows the connection of the client terminal 20 with the application server 40 if a counter value in the connectable-number counter 34 is greater than or equal to a reference value of 1, and refuses the connection if the counter value is 0 less than the reference value.

The connection management section 31 also functions as priority-order set means and connection-order set means. That is, when it receives a first connection request, the connection management section 31 gives a reference number, for deciding the connection priority, to the client terminal 20 which has been refused a connection, and then manages the order of connection based on the reference number. To perform this management, the accepting server 30 is provided with a connection queue data holding section (or connection queue data holding means) 35 and the aforementioned connection-right acquired pool section (or connection-right data holding means) 36. In this embodiment of the present invention, the connection queue data holding section 35 and the connection-right acquired pool section 36 are part of the memory region of Java Virtual Machine by which a program group written in Java language for controlling the accepting server 30 is operated.

The connection management section 31 generates a connection queue B in which data are arranged in the order of reference numbers, based on the reference numbers given to the client terminals 20, and causes the connection queue data holding section 35 to hold the generated data. Also, at the time that the application server 40 reaches a state in which a connection request from the client terminal 20 can be accepted (i.e., the counter value in the connectable-number counter 34 is 1 or greater), the connection management section 31 functions as the connection-right granting means in order to transfer the data of the reference number whose connection priority is the highest in the connection queue B, from the connection queue data holding section 35 to the connection-right acquired pool section 36. With this, the client terminal 20 whose data of the reference number is present in the connection-right acquired pool section 36 can be discriminated as the client terminal 20 allowed a connection right. Then, when there is a second connection request from the client terminal 20, if a reference number corresponding to that client terminal 20 is present in the connection-right acquired pool section 36, the connection management section 31 functions as connection allowance means in order to allow the connection of the client terminal 20 with the application server 40.

Furthermore, the connection management section 31 functions as program transmission means to transmit a connection-request execution program to the client terminal 20 given a reference number. The connection-request execution program is used for causing the client terminal 20 to again execute a connection request to the accepting server 30, after a predetermined time period.

Now, the acceptance process in the accepting server 30 constructed as described above will be described in detail with reference to FIGS. 2 through 9.

When receiving a connection request from the client terminal 20 through the network 10, the accepting server 30 makes reference to the connectable-number counter 34 and decides whether or not the counter value is 1 or greater (step S101: decision process). As a result, in the case where the counter value is 1 or greater, the accepting server 30 accepts a connection request from the client terminal 20 (step S102) and adds 1 to the counter value (i.e., the number of connections) of the connection-number counter 33 (step S103).

Then, the connection management section 31 allows the client terminal 20 to connect with the application server 40 and transmits data, containing uniform resource locators (URL: data for specifying a target connection server), for connecting with the application server 40, to the client terminal 20. The client terminal 20 receiving this logs in to the connection management section 41 of the application server 40 shown in FIG. 1 and requests an application processing section 42, which executes processing based on an application program, to perform a predetermined process (step S104).

In the case where, in step S101, the counter value of the connectable-number counter 34 is not 1 or greater, i.e., in the case where the counter value is 0, the acceptance process shifts to a reference-number issue process (step S200: priority order set process).

Figure 3:
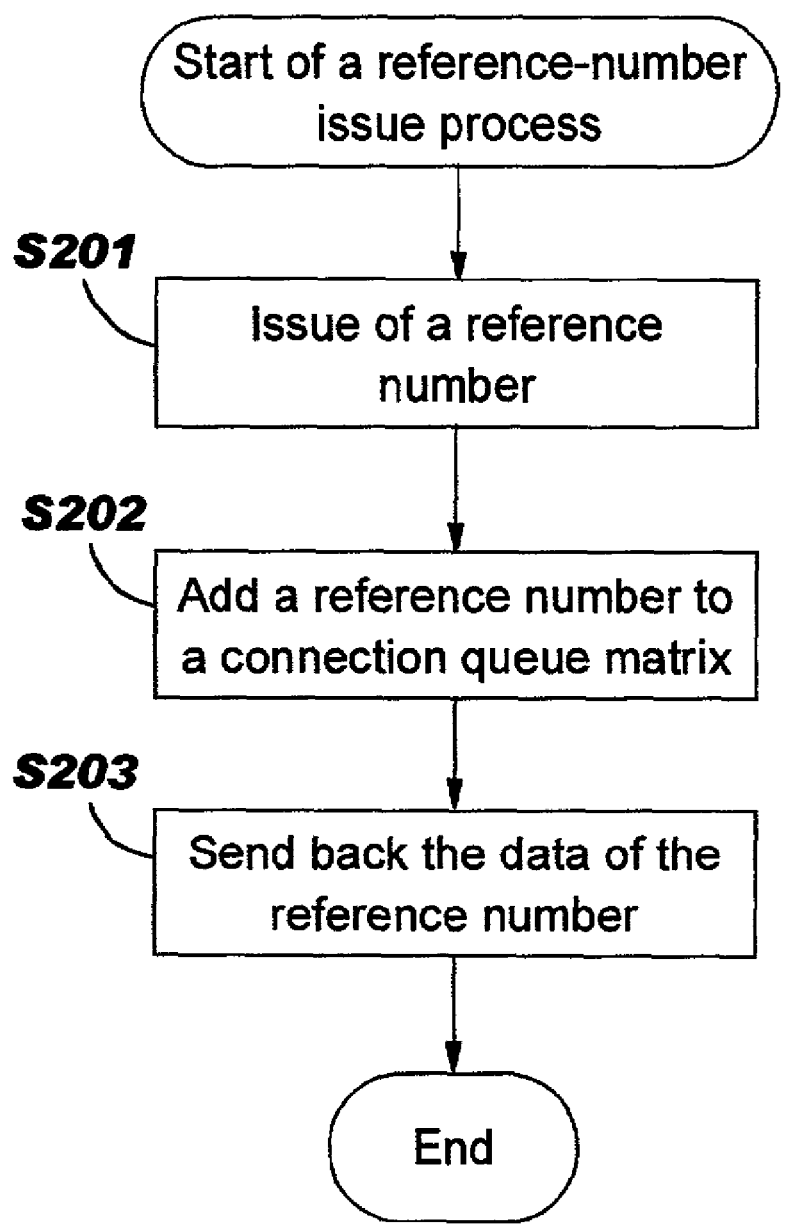
FIG. 3 is a diagram showing a flow of a process for issuing a reference number to a client terminal.

In the reference-number issue process, as shown in FIG. 3, the connection management section 31 of the accepting server 30 issues a reference number which indicates the connection priority to the client terminal 20 (step S201). The reference number to be issued will be satisfied if the accepting server 30 can identify the connection priority for the client terminal 20. In this embodiment, the reference number consists, for example, of "YYYYMMDD#n," where Y indicates year, M indicates month, D indicates date, and n indicates a number, issued in sequence on the day of its issue.

The connection management section 31 adds the issued reference number to the connection queue B held in the connection queue data holding section 35 (step S202).

In step S203, the accepting server 30 sends back the data of the reference number issued by the connection management section 31 to the client terminal 20. In sending back the reference number data, the accepting server 30 transmits the data of a character string representing the reference number, to the client terminal 20 as a "Cookie." The accepting server 30 also sends back data, responding to the connection request from the client terminal 20, for display on the browser screen of the client terminal 20.

Figure 5:
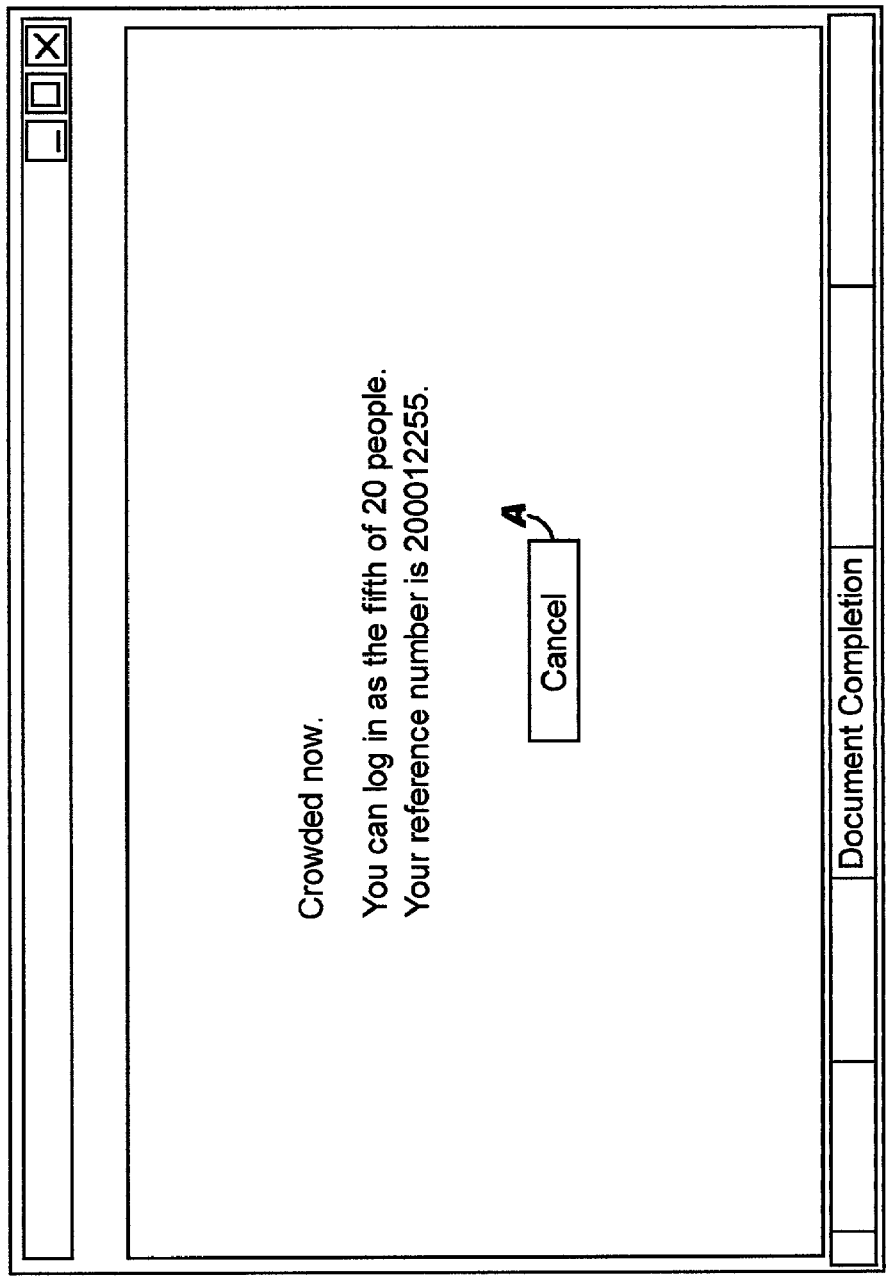
FIG. 5 is a diagram showing an example of a screen, including information on a reference number which is displayed on the client terminal.

As the data for displaying the response on the browser screen of the client terminal 20, this embodiment sends back, for example, data described in hypertext markup language (HTML), such as that shown in FIG. 4. Based on this data, the browser screen of the client terminal 20 displays messages (information on the connection priority), such as "Crowded now," "You can log in in the order of ($Order) of ($Queue Size) people," "Your reference number is ($DTX_Ticket)," etc. The "$Queue Size" is the size of the connection queue B (the number of client terminals 20 which are waiting for connection) which is present in the connection queue data holding section 35. The "$Order" is the connection priority within the connection queue B. The "$DTX_Ticket" is a reference number given by the "Cookie." On the actual browser screen, a numeral string, etc., output from the accepting server 30, is displayed. FIG. 5 shows an example of a browser screen that may be used for displaying such messages.

Based on a source code, shown in the part A of FIG. 4, of the data sent back from the accepting server 30, the client terminal 20 is loaded with this data and caused to process a reconnection request ("requestConnect") with respect to the accepting server 30 after a predetermined time period ("$Interval"). The word "$Interval" is a numerical value that is set by the accepting server 30, as described later. The "requestConnect( )" process is the process of sending a connection request to "/servlet/ConnectServelt" (i.e., an example of the URL for the accepting server 30) which is data for specifying a target connection server, as shown in a source code in part B of FIG. 4.

In this manner, in the aforementioned step 230, the accepting server 30 transmits to the client server 20, the program for automatically sending a connection request to the accepting server 30 after the time period ($Interval) set by the accepting server 30 has elapsed (transmission program, program transmission program). With this, the client terminal 20, given a reference number, automatically transmits a connection request again to the accepting server 30 after a predetermined time period.

In transmitting the data of the automatic connection request to the client terminal 20, as described above, the accepting server 30 sets a set time period ("$interval") for executing the automatic connection request. The value of this set period may be based on the connection priority, in the connection queue B of the connection queue data holding section 35, of the reference number issued to the client terminal 20. More specifically, the set time period ("$interval") may be, for example, 10 sec for reference numbers whose connection priority is first to tenth in the connection queue B of the connection queue data holding section 35. Also, the set time period ("$interval") may be, for example, 30 sec for reference numbers whose connection priority is eleventh to fiftieth, and may be for example, 60 sec for reference numbers whose connection priority is fifty-first to one-hundredth.

Figure 6:
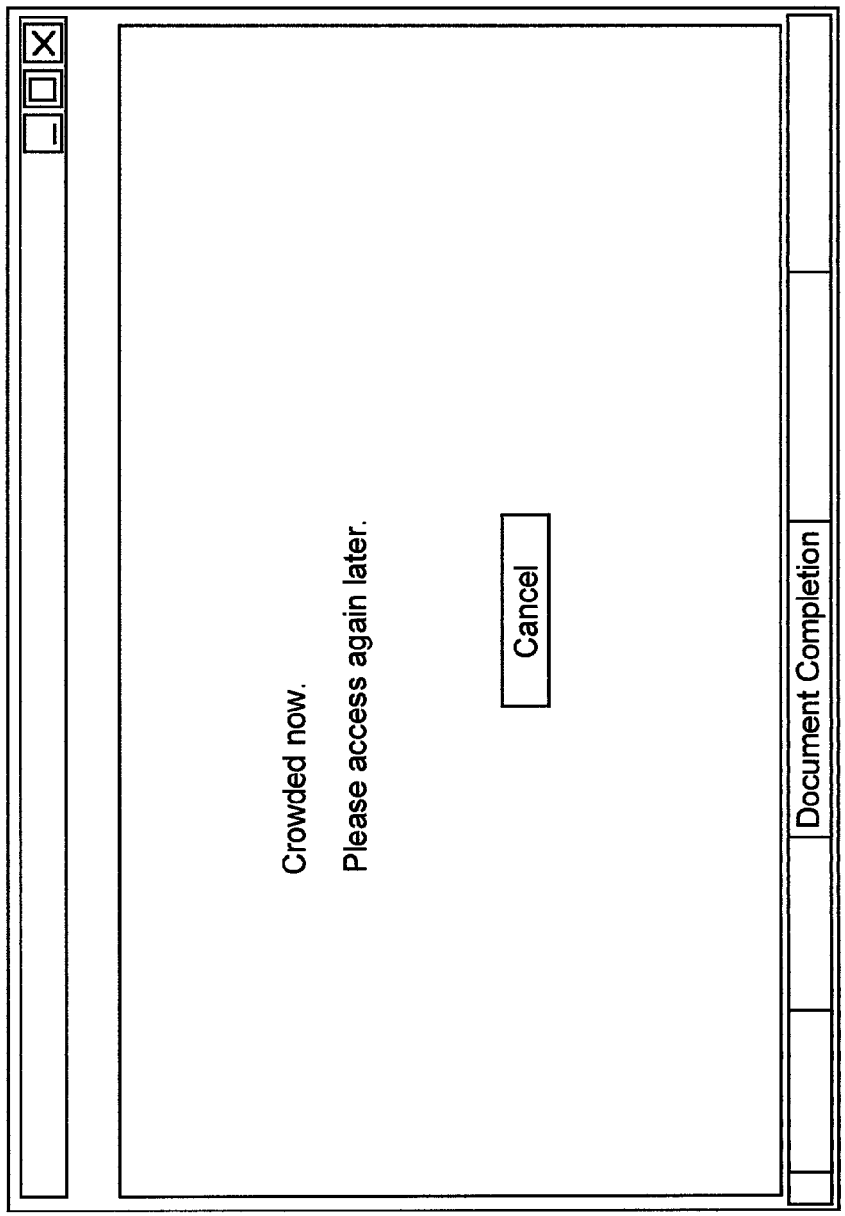
FIG. 6 is a diagram showing another example of the screen that is displayed on the client terminal.

In the case where the connection queue B in the connection queue data holding section 35 has reached its maximum queue size previously set, the accepting server 30 may transmit data for displaying a display screen such as that shown in FIG. 6 to the client terminal 20, without issuing a reference number. In this case, the program for automatically transmitting a connection request again is not transmitted to the client terminal 20, so a connection request at the client terminal 20 will be manually repeated.

Note that the granularity of the set time period stages, the length of the set time period at each stage, and the priority order which becomes a threshold value for each stage, are not limited to the aforementioned numerical values. Also, depending on its performance, the accepting server 30 may transmit the reference number and the automatic transmission program for a connection request to all the client terminals 20, instead of displaying the display screen of FIG. 6 without issuing the reference number.

Figure 7:
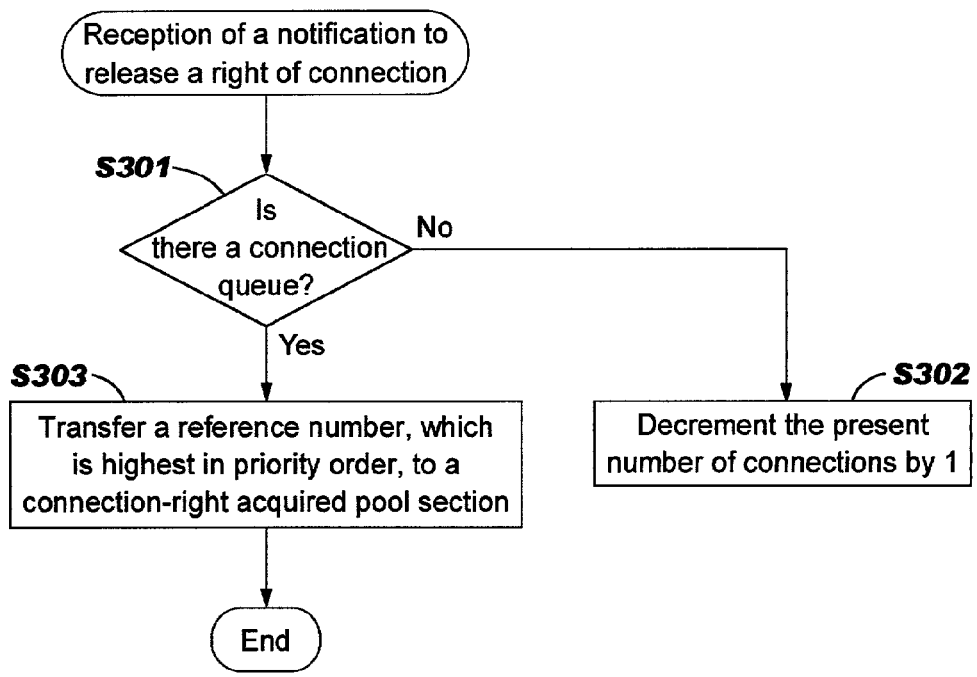
FIG. 7 is a diagram showing a flow of a process for giving the client terminal a right of connection.

As shown in FIG. 7, in the case where the client terminal 20 ends its connection to the application server 40, the application server 40 informs the accepting server 30 that a connection right to the application server 40 has been released. If it is informed of the release of the connection right, the accepting server 30 first makes reference to the connection queue data holding section 35 and then confirms whether or not there is a connection queue B (step S301).

As a result, if there is no connection queue B, the counter value (i.e., the number of present connections) in the connection-number counter 33 is decremented by 1 and the counter value of the connectable-number counter 34 is incremented by 1 (step S302).

On the other hand, in the case where there is a connection queue B, the counter value (i.e., the number of present connections) in the connection-number counter 33 is decremented by 1. Also, the reference number in the connection queue B which has the highest connection priority is transmitted to the connection-right acquired pool section 36. With this, a connection right is granted to the client terminal 20 whose reference number has been transmitted to the connection-right acquired pool section 36 (step S303: connection-right grant process). Note that the reference number transmitted to the connection-right acquired pool section 36 is erased from the connection queue B, so each reference number in the connection queue B becomes higher in priority order of connection by 1.

If the accepting server 30 performs the aforementioned process, the client terminal 20 automatically executes a rerun of connection request with the accepting server 30 after a predetermined time period, based on the data transmitted in step S203 of FIG. 3 (see FIG. 4). At the time of this rerun of connection request, the data of the "Cookie" representing the reference number transmitted from the accepting server 30 to the client terminal 20 is attached and transmitted to the accepting server 30.

Figure 8:
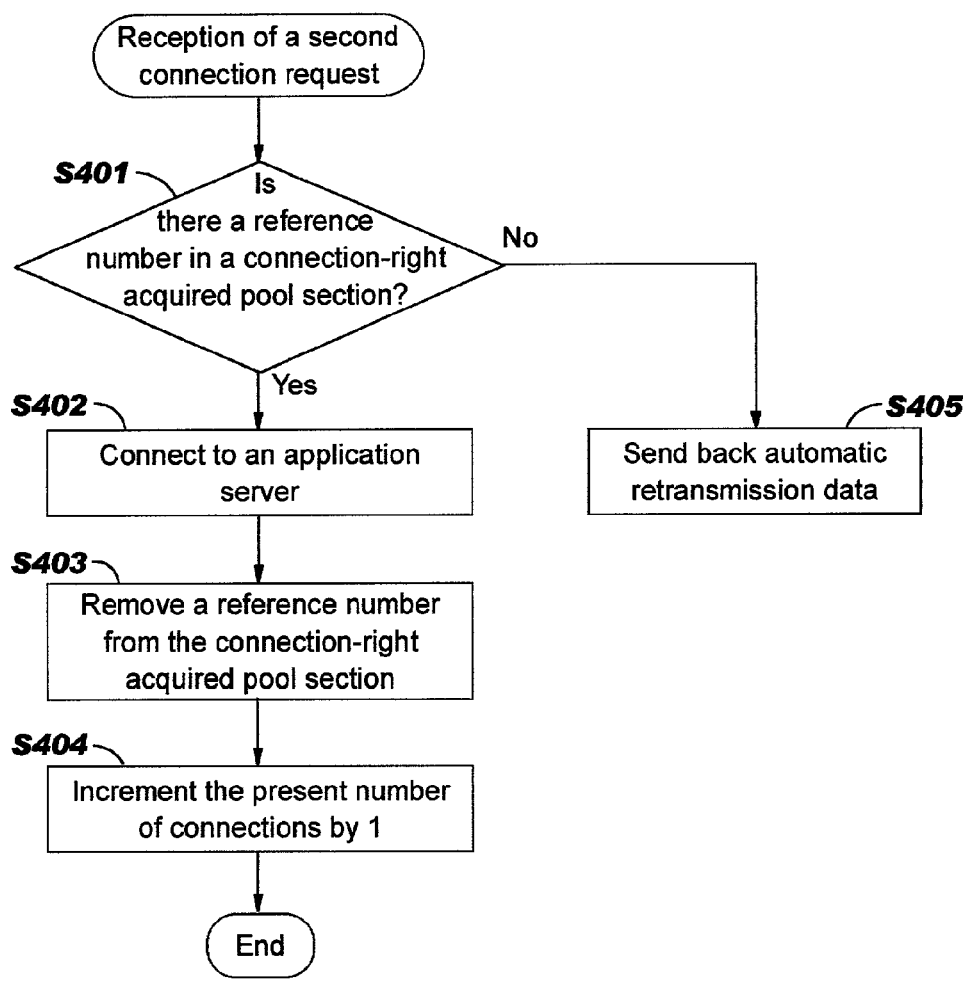
FIG. 8 is a diagram showing how processing is performed when a connection request is received from the client terminal to which a reference number has been issued.

If the accepting sever 30 receives the rerun of the connection request from the client terminal 20, the connection management section 31 acquires the reference number contained in the character string in the data of the "Cookie" attached to the rerun of the connection request and confirms whether or not the reference number is present in the connection-right acquired pool section 36, as shown in FIG. 8 (step S401: connection-right confirmation process).

As a result, in the case where a reference number is present in the connection-right acquired pool section 36, the client terminal 20 is specified from the Cookie data and the connection of this client terminal 20 with the application server 40 is allowed. Then, the data that contains the URL for connecting with the application server 40 is transmitted to the client terminal 20. The client terminal 20 logs in to the connection management section 41 of the application server 40 (step S402: connection allowance process).

Next, the above-mentioned reference number is erased from the connection-right acquired pool section 36 (step S403), and the counter value (i.e., the number of present connections) of the connection-number counter 33 is incremented by 1 (step S404).

In the case where, in step S401, no reference number is present in the connection-right acquired pool section 36, the connection management section 31 transmits the automatic-retransmission data for a request to the accepting server 30 to the client terminal 20, as with the case shown in FIG. 4 (step S405). Note that the "$QueueSize," "$Order," "$DTX_Ticket," and "$Interval" in the data to be transmitted are set to numerical values according to the status of the connection queue B of the connection queue data holding section 35 at that time.

With this, a connection request to the accepting server 30 can be automatically retransmitted from the client terminal 20 after a predetermined time period ($Interval), based on the automatic-retransmission data transmitted in step S405.

On the side of the client terminal 20, a cancel button A, may be displayed on the browser screen, as shown in FIG. 5, based on the data (see FIG. 4) transmitted from the accepting server 30 in steps S203 of FIG. 3 and S405 of FIG. 8. When this cancel button A is operated at the client terminal 20, the process of "cancelRequest" is executed as shown in the part C of FIG. 4. The "cancelRequest" process is the process of requesting the accepting sever 30 (/servlet/ConnectServlet: an example of URL) to cancel a reference number, as shown in the source code of the part D in FIG. 4. The cancel request, along with the "Cookie" received from the accepting server 30, is transmitted to the accepting server 30.

In the accepting server 30 receiving the cancel request, the reference number obtained from the "Cookie" is removed from the connection queue data holding section 35.

Figure 9:
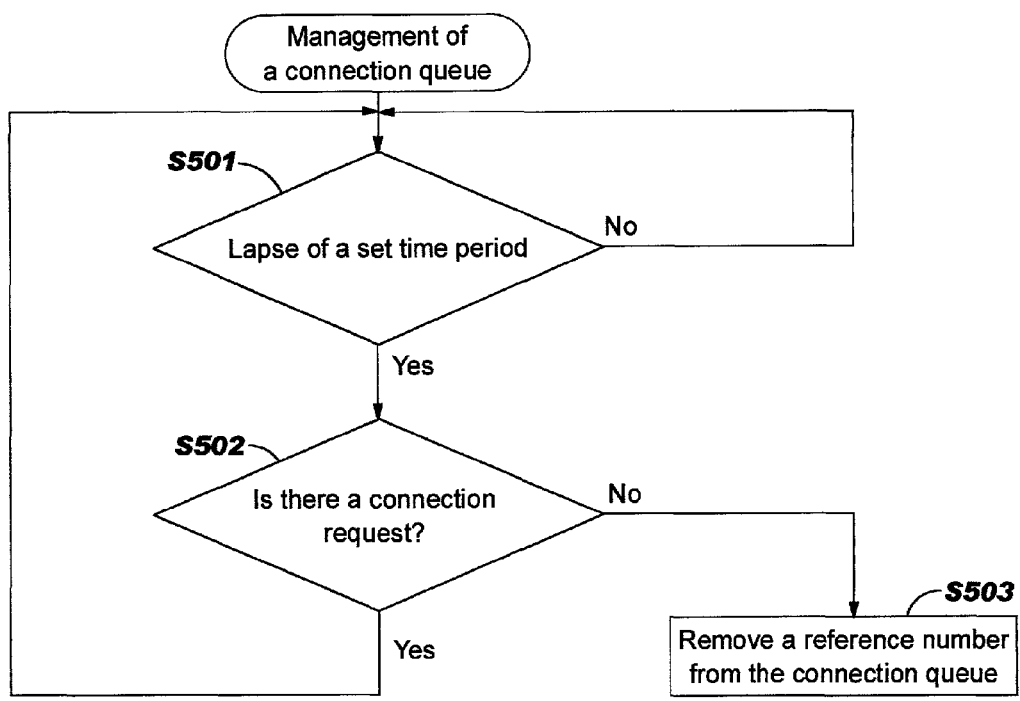
FIG. 9 is a diagram showing how the server manages a connection queue.

Also, the accepting server 30 manages data held in the connection queue data holding section 35, as shown in FIG. 9. Each time a previously set time period has elapsed (step S501), the accepting server 30 confirms whether or not a connection request has been transmitted again from the client terminal 20 corresponding to a reference number in the connection queue B held in the connection queue data holding section 35 (step S502).

As a result, if a connection request is rerun, the accepting server 30 returns to step S501 and repeats the same process. On the other hand, in the case where the connection request is not rerun within the set time period (e.g., in the case where the browser on the side of the client terminal 20 has been closed), the corresponding reference number is removed from the connection queue data holding section 35 (step S503).

In the aforementioned manner, the accepting server 30 receives a request to connect with the application server 40, made via the network 10 by the client terminal 20. The accepting server 30 also issues a reference number to the client terminal 20 when a first connection request is made. Based on this reference number, the connection priority with the application server 40 is managed. Furthermore, when issuing the reference number, the accepting server 30 transmits the program for automatically sending a connection request after a predetermined time period, to the client terminal 20. Then, when the client terminal 20 executes the second connection request, the client terminal 20 can automatically connect with the application server 40 if it has acquired a connection right. The client terminal 20 can repeat the connection request again after a predetermined time period, if it has not acquired a connection right.

This eliminates the necessity for the client terminal 20 to repeat a connection request by trial and error. Thus, the processing load on the side of the accepting server 30 can be alleviated. In addition, it becomes possible to perform the process reliably and quickly and the management of connections can be performed strictly according to priorities that correspond to order of arrival.

In addition, the accepting server 30 sets a time period for the next connection request in accordance with the connection priority in the connection queue B and also makes a time period for the client terminal 20 having a lower connection priority longer than that for the client terminal 20 having a higher connection priority. Therefore, the number of connection requests can be reduced as a whole and the processing load on the accepting server 30 can be reduced.

Furthermore, the accepting server 30 and the application server 40 are independently provided so that only the client terminal 20 that is allowed to be connected by the accepting server 30 is connected to the application server 40. Thus, the application server 40 does not need to process connection requests and is capable of performing the original process more efficiently.

Furthermore, the user can see his status while waiting for a connection with the application server 40, because information such as a connection priority in the connection queue B, a reference number, etc., is displayed on the browser screen of the client terminal 20, based on the data transmitted from the accepting server 30.

At this time, if the accepting server 30 predicts the time needed for acquiring a right of connection, based on the average processing time in the application server 40, it is also possible to display this on the browser screen of the client terminal 20.

While, in the above-mentioned embodiment, information such as a reference number is displayed on the browser screen of the client terminal 20, the contents of the information can be changed as appropriate. It is not necessary, however, not to display this information.

The reference number may be conveyed by any means, so long as the accepting sever 30 can specify the connection priority given to the client terminal 20. For example, the reference number may contain time in addition to year, month, and day. Also, a character string, or other symbolic identifier may be employed instead of a numerical string.

Figure 10:
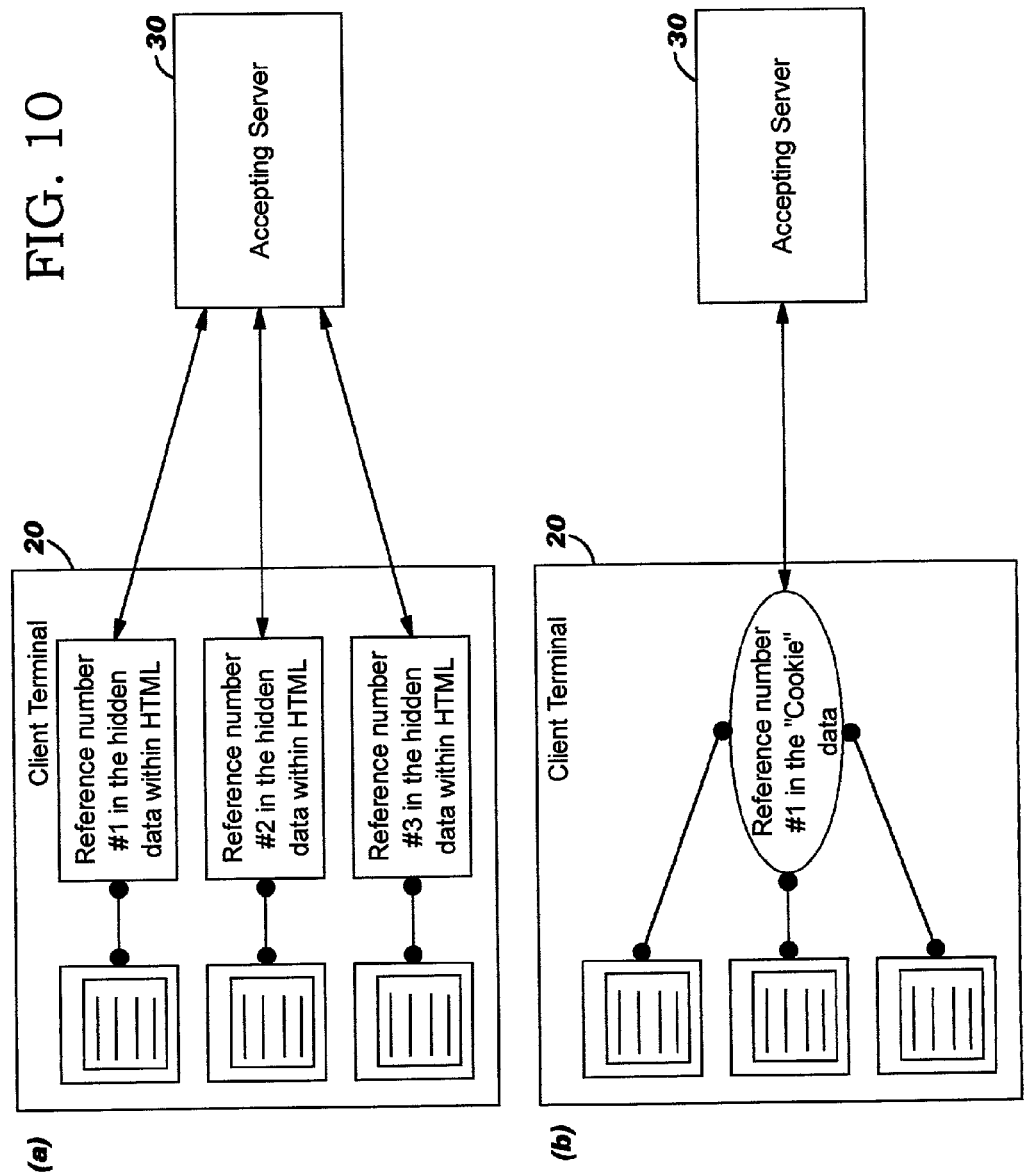
FIGS. 10A and 10B are diagrams showing how a reference number is transmitted to the client terminal, the difference being shown between the case of hidden data (FIG. 10A) and the case of "Cookie" data (FIG. 10B).

The accepting server 30 may issue a reference number in the form of "Cookie" to the client terminal 20. However, the reference number may instead be transmitted as data transmittable to the accepting server 30, such as hidden data, contained in the HTML data which is transmitted from the accepting sever 30 to the client terminal 20, URL embedding a reference number, etc. Also, it can be transmitted as a part of a program for generating transmission data by use of script language such as JavaScript, VBScript, etc. Furthermore, it can be transmitted as data that is used for making reference to a program for generating transmission data. In this case, as shown in FIG. 10A, the same client terminal 20 can receive issue of a plurality of reference numbers, if it opens a plurality of browser windows and executes a connection request to the accepting server 30 through the respective browser screens. In the case of "Cookie" data, as shown in FIG. 10B, only a single reference number can be acquired, even if a plurality of browser windows are employed. In the case of employing hidden data, however, data for a reference number will be lost, if the browser window is closed or overwritten with another document. On the other hand, in the case employing "Cookie" data shown in the above-mentioned embodiment, there is no possibility that a reference number will be lost, as long as the term of validity for the "Cookie" does not expire.

While the data for automatically resending a connection request may be transmitted in the form of HTML from the accepting server 30 to the client terminal 20, it also may be transmitted in other languages or data forms, such as extensible markup language (XML) More specifically, the above-mentioned embodiment is also applicable, for example, when using a program operable within a browser such as an applet program as the client terminal 20, and the case of using a program, other than a browser program, which communicates with the accepting server 30 as the client terminal 20. In that case, the data that is transmitted from the accepting server 30 to the client terminal 20 can also be transmitted as data inherent to an application program rather than data described, for example, in HTML language or XML language.

Figure 11:
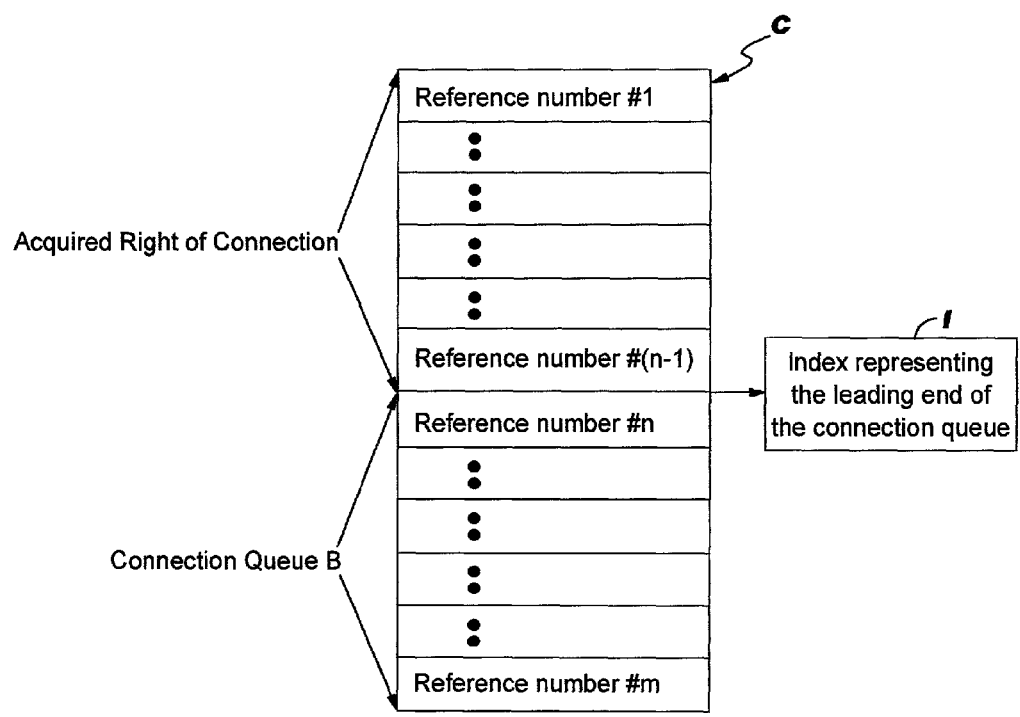
FIG. 11 is a diagram showing the case where a connection queue, and client terminals granted rights of connection, are arranged in the same matrix and discriminated with an index, when the server manages client terminals, based on reference numbers.

In the above-mentioned embodiment, the connection queue data holding section 35 holds the data of the connection queue B, and the connection-right acquired pool section 36 holds the data of a reference number having a right of connection. However, the data held by the holding section 35 and the data held by the pool section 36 can be combined and managed in a single matrix, as shown in FIG. 11. That is, a matrix C may be generated so that reference numbers are arranged in the order of connection priority and that an index I indicating the leading end of the connection queue B is provided between the connection-right acquired group and the connection queue B. In this case it becomes possible to perform management with only a single matrix.

As shown in FIG. 12, as with FIG. 11, a matrix D may be generated so that reference numbers are arranged in the order of connection priority and given status information indicating whether or not there is a right of connection.

In the above-mentioned embodiment, the connection queue data holding section 35 and the connection-right acquired pool section 36 are held in the memory region of Java Virtual Machine on which Java programs for controlling the accepting server 30 work. However, the data held by these sections can also be stored in a database. Similarly, the data for the matrixes C and D shown in FIGS. 11 and 12 can be stored in a database. However, in the case of utilizing the database, there are cases where throughput will be reduced compared with the case of holding data in the memory region of Java, because it is necessary to read out or write data from or to the database. Note that in the case of holding data in a memory region that is utilized by a program, language other than Java may be utilized as programming language.

The accepting server 30 may be constructed in various ways, as long as the functions shown in the above-mentioned embodiment are realized. For instance, the accepting server 30 may adopt the common gateway interface (CGI) most widely used, or can also adopt a servlet that can be expected to enhance throughput.

The accepting server 30 and the application server 40 can also be realized as a single server, if they are functionally separated from each other. In order to enhance the entire throughput, the accepting server 30 may be provided with a plurality of application servers 40. Also, there may be a plurality of pairs of an accepting server 30 and an application server 40. However, in this case it is necessary that each pair control reference numbers independently and that the client terminal 20 also send a connection request to the accepting server 30 of the same pair. On the other hand, if the function of generating a reference number, the connection queue data holding section 35, and the connection-right acquired pool section 36 are separated from the accepting server 30 to construct a new server, and this new server is connected with a plurality of accepting servers 30 and application servers 40, the new server can also manage reference numbers collectively while enhancing the entire system throughput.

The program for issuing a reference number at the time of receiving a connection request and for managing a connection based on the reference number, the program for transmitting the data for the automatic retransmission of the connection request to the client terminal 20, the program for setting different time intervals for the automatic retransmission, and so forth, can also be achieved by the following storage media and program transmission units.

That is, the above-mentioned programs that are executed by a computer can be stored in a storage medium, such as a CD-ROM, a DVD, memory, a hard disk, etc., so that the computer can read out the programs.

The program transmission unit may be provided with storage means, such as a CD-ROM, a DVD, memory, a hard disk, etc., in which the aforementioned programs are stored, and transmission means for reading out the programs from the storage means, and transmitting the programs to a unit which executes the programs, through connectors, or a network such as the Internet, a local area network, and so forth. Such a program transmission unit is particularly suitable for installing the aforementioned programs in the accepting server 30.

As has been described above, the present invention is capable of reducing a processing load on the server that receives a request for connection from a client terminal, executing processing quickly and reliably, and acceptance connection requests in the order of arrival.

While the present invention has been described with reference to the preferred embodiment thereof, the invention is not limited to the details given herein, but may be modified within the scope of the invention claimed.

What is claimed is:

1. A connection accepting system, comprising:
 a first server for accepting connection requests from client terminals through a network, wherein the first server includes:
  a priority order setting unit which, upon receiving a first connection request from a first client terminal of the client terminals, sets a connection priority for the first client terminal and transmits data conveying the connection priority for display on the first client terminal, the data conveying the connection priority comprising an order of connection for the first client terminal,
   wherein the order of connection for the first client terminal is determined by the priority order setting unit upon receiving the first connection request from the first client terminal of the client terminals, and in response to a refusal to grant the first connection request due to the number of client terminals currently connected to the server;
  a maximum-connection-number setting counter for setting a maximum number of connections that can be connected simultaneously to the second server;

a connection-number counter for indicating a number of client terminals currently connected to the second server; and a connectable-number counter for indicating a number of client terminals that can be connected to the second server;

a connection managing unit for allowing connection of the client terminals according to connection priority upon receiving a second connection request from a second client terminal of the client terminals after the first connection request;

a second server for executing a process according to requests from the client terminals, wherein the first server accepts the first and second connection requests as connection requests for the second server and, when the connection managing unit allows connection of the first and second client terminals, connects the first and second client terminals with the second server, wherein the number of client terminals that can be connected to the second server is equal to a difference between a value of the maximum number of connections that can be connected simultaneously to the second server and a quantity equal to a value of the number of client terminals currently connected to the second server and a number of client terminals whose reference number is present in a connection-right acquired pool section.

2. The connection accepting system of claim 1,
wherein the connection managing unit further transmits a program for execution on the first client terminal in response to the refusal to grant the first connection request, and
wherein execution of the program by the first client terminal causes a second connection request to be automatically executed again by the first client terminal after a predetermined time interval.

3. The connection accepting system of claim 2, wherein a length of the predetermined time period is dependent upon the connection priority for the client terminal, wherein a client terminal having a high priority has a shorter predetermined time period than a client terminal having a low priority.

4. The connection accepting system of claim 1, wherein the connection managing unit is configured to allow connection of one of the client terminals which is highest in the order of connection, after acceptance of connection of a new client terminal has become possible, based on the number of connectable client terminals indicated by the connectable-number counter.

5. The connection accepting system of claim 4, wherein the connection managing unit is configured to allow the connection when the number of connectable client terminals indicated by the connectable-number counter is at least one.

6. A connection-acceptance managing method comprising the steps of:
receiving a connection request on a server from a client terminal;
deciding, in response to the connection request, whether connection to the server is refused, wherein the deciding further includes:
setting a maximum number of connections that can be connected simultaneously to the server;
indicating a number of client terminals currently connected to the server; and
indicating a number of client terminals that can be connected to the server,
wherein the deciding is based on at least one of the maximum number of connections that can be connected simultaneously to the server, the number of client terminals currently connected to the server, or the number of client terminals that can be connected to the server;
in a case in which connection to the server is refused, setting a connection priority for the client terminal;
granting a right of connection to the client terminal according to the connection priority when connection to the server becomes possible; and
determining whether the right of connection has been granted to the client terminal, when a connection request is made by the client terminal to which the connection priority has been set, and allowing connection of the client terminal to the server when the right of connection has been granted.

7. The connection acceptance managing method of claim 6, further comprising:
generating a connection queue, based on the connection priority, and holding data of the generated connection queue; and
holding data for identifying the client terminal granted the right of connection,
wherein, when a connection request is received from the client terminal, reference is made to the data for identifying the client terminal and allowing connection of the client terminal when the right of connection has been granted to the client terminal.

8. The connection acceptance managing method of claim 6, further comprising:
containing information on the connection priority set to the client terminal in a cookie, and transmitting the information for storage on the client terminal.

9. The connection-acceptance managing method of claim 6, further comprising, in the case in which connection to the server is refused, transmitting to the client terminal a program for automatically executing a connection request again after a predetermined time period.

10. The connection-accepting managing method of claim 9, wherein a length of the predetermined time period is dependent upon the connection priority for the client terminal, wherein a client terminal having a high priority has a shorter predetermined time period than a client terminal having a low priority.

11. The connection-acceptance managing method of claim 6,
wherein the granting the right of connection to the client terminal further comprises allowing connection of one of the client terminals which is highest in the order of connection, after acceptance of connection of a new client terminal has become possible, based on the number of connectable client terminals indicated by the connectable-number counter.

12. The connection-acceptance managing method of claim 6, further comprising
in the case in which connection to the server is refused, displaying the connection priority for the client terminal on a display.

13. A storage medium storing a computer program product which when executed by a computer system, causes the computer system to accept requests for connection from client terminals by performing a method comprising:
deciding, in response to a connection request, whether connection is refused; wherein the deciding includes:
setting a maximum number of connections that can be connected simultaneously to the computing device;
indicating a number of client terminals currently connected to the computing device; and indicating a number of client terminals that can be connected to the computing device, wherein the deciding is based on at least one of the maximum number of connections that can be connected simultaneously to the computing device, the number of client terminals currently connected to the computing device, or the number of client terminals that can be connected to the computing device, setting a connection priority for the client terminal when the connection is refused;

granting a right of connection to a client terminal having highest connection priority;

a connection-right confirmation process for confirming whether the right of connection has been granted to the client terminal, and allowing connection of the client terminal when the connection-right confirmation process confirms that the right of connection has been granted.

14. The storage medium of claim 13, wherein the method further comprises:

when the connection is refused, transmitting to the client terminal data of the connection priority and a program for causing the client terminal to automatically execute a connection request again after a predetermined time period.

15. The storage medium of claim 14, wherein a length of the predetermined time period is dependent upon the connection priority for the client terminal, wherein a client terminal having a high priority has a shorter predetermined time period than a client terminal having a low priority.

* * * * *